US010288986B2

(12) United States Patent
Blake, III et al.

(10) Patent No.: US 10,288,986 B2
(45) Date of Patent: May 14, 2019

(54) MODERATION OF A DRIVER ASSIST CAMERA ENHANCEMENT VIA A VEHICLE WINDSHIELD

(71) Applicant: TRW AUTOMOTIVE US LLC, Livonia, MI (US)

(72) Inventors: Thomas E. Blake, III, Novi, MI (US); Anthony L. Rivas, Howell, MI (US); Daniel D. Carlson, Fenton, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 74 days.

(21) Appl. No.: 15/439,041

(22) Filed: Feb. 22, 2017

(65) Prior Publication Data

US 2018/0239223 A1 Aug. 23, 2018

(51) Int. Cl.
G03B 17/55 (2006.01)
B60R 11/04 (2006.01)
H04N 5/225 (2006.01)

(52) U.S. Cl.
CPC ............. *G03B 17/55* (2013.01); *B60R 11/04* (2013.01); *H04N 5/22521* (2018.08)

(58) Field of Classification Search
CPC ...... G03B 17/55; B60R 11/04; H04N 5/2252; H04N 7/183
See application file for complete search history.

(56) References Cited

U.S. PATENT DOCUMENTS

| 8,339,453 | B2* | 12/2012 | Blake, III | ............... B60R 11/00 348/148 |
| 9,225,884 | B2* | 12/2015 | Blake, III | ............... B60R 11/00 |
| 9,415,662 | B2 | 8/2016 | Blake, III et al. | |
| 9,896,039 | B2* | 2/2018 | Achenbach | .......... H04N 5/2257 |
| 9,910,000 | B2* | 3/2018 | Lynam | .................. G01N 25/66 |
| 10,053,009 | B2* | 8/2018 | Kim | ...................... H04N 5/2254 |
| 2011/0216429 | A1* | 9/2011 | Lynam | ............... B60H 1/00785 359/871 |
| 2016/0119509 | A1 | 8/2016 | Wato | |
| 2017/0064175 | A1* | 3/2017 | Furutake | ............ G06K 9/00798 |

* cited by examiner

Primary Examiner — Mishawn N Hunter
(74) Attorney, Agent, or Firm — Tarolli, Sundheim, Covell & Tummino LLP

(57) ABSTRACT

An apparatus for moderating the environment of a driver assist camera comprises (a) a housing in which the driver assist camera is mountable and (b) a bracket configured and dimensioned to receive and retain the housing. The bracket when installed in a vehicle is attached to a window of the vehicle. A thermally conductive body is movably mounted on the bracket. The housing when being received in the bracket contacts and moves the thermally conductive body relative to the bracket so as to press the thermally conductive body against the window and permit heat from the housing to be conducted to the window, thereby moderating the environment of the driver assist camera when mounted in the housing.

6 Claims, 2 Drawing Sheets

MODERATION OF A DRIVER ASSIST CAMERA ENHANCEMENT VIA A VEHICLE WINDSHIELD

FIELD OF THE INVENTION

The present invention relates to an apparatus to moderate an environment of a driver assist ("DAS") camera via a vehicle windshield.

BACKGROUND

DAS cameras are incorporated in a vehicle to acquire information and provide the acquired information to a vehicle safety system designed to assist the driver. A DAS camera may be mounted on or near the vehicle windshield to ensure a desired field of view. The DAS camera and its mounting system should be as small as possible to reduce interference with sight lines through the windshield. At the same time, multiple electronic components are mounted adjacent to the DAS camera to process the information acquired by the DAS camera and communicate the processed information via electronic signals to one or more other systems within the vehicle. As a result, the DAS camera and the associated electronic components will emanate substantial heat that requires dissipation to avoid thermal damage to the DAS camera and/or the adjacent or associated electronic components.

SUMMARY OF THE INVENTION

The present invention is directed to an apparatus to moderate an environment of a DAS camera via a vehicle windshield and, more particularly, to an apparatus for dissipating heat from the DAS camera to an exterior of a vehicle via the vehicle windshield or windscreen.

In accordance with an example embodiment of the present invention, an apparatus for moderating the environment of a driver assist camera comprises (a) a housing in which the driver assist camera is mountable and (b) a bracket configured and dimensioned to receive and retain the housing. The bracket when installed in a vehicle is attached to a window of the vehicle. A thermally conductive body is movably mounted on the bracket. The housing when being received in the bracket contacts and moves the thermally conductive body relative to the bracket so as to press the thermally conductive body against the window and permit heat from the housing to be conducted to the window, thereby moderating the environment of the driver assist camera when mounted in the housing.

DETAILED DESCRIPTION

Figure 1:
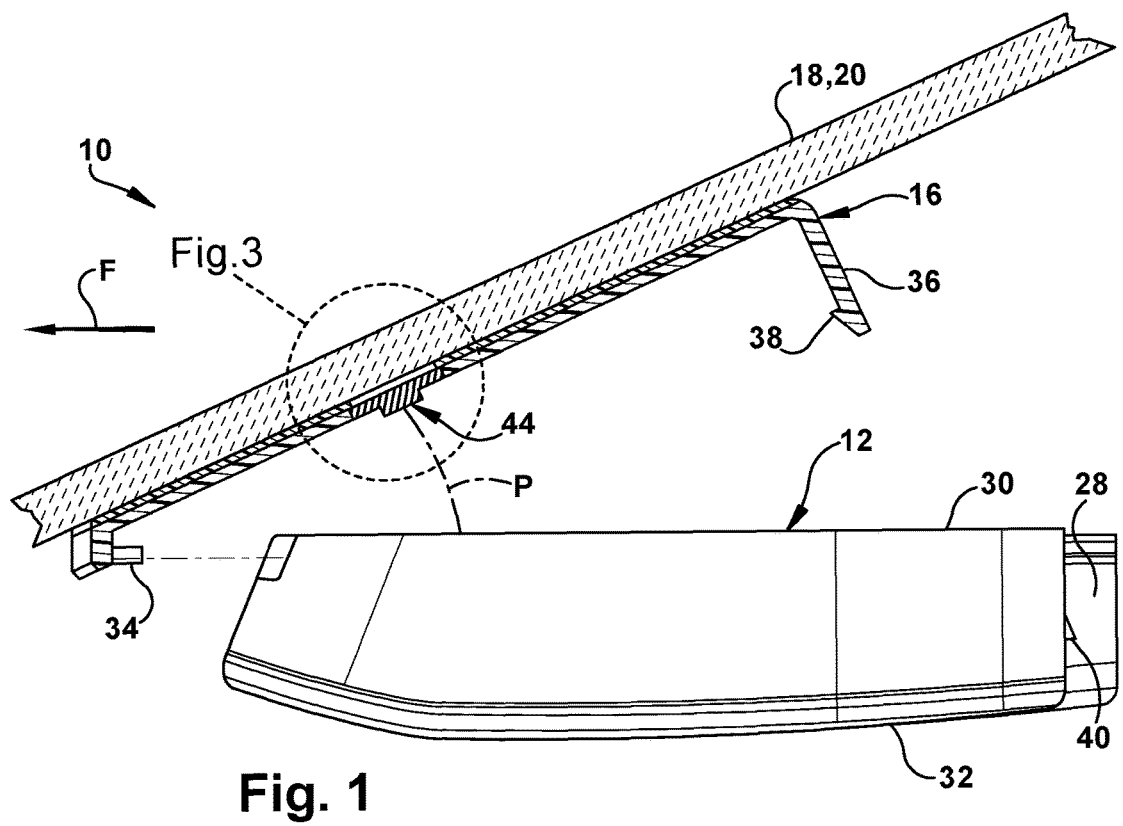
FIG. 1 is a schematic illustration of an apparatus in accordance with an example embodiment of the present invention.

FIG. 1 illustrates a system or apparatus 10 for moderating the environment around a DAS camera in accordance with an example embodiment of the present invention. The apparatus 10 includes a housing 12 that contains or supports a vision device 14 (FIG. 2), such as a CCD or CMOS camera. The apparatus 10 also includes a bracket 16 configured and dimensioned to receive and retain the housing 12.

Figure 3:
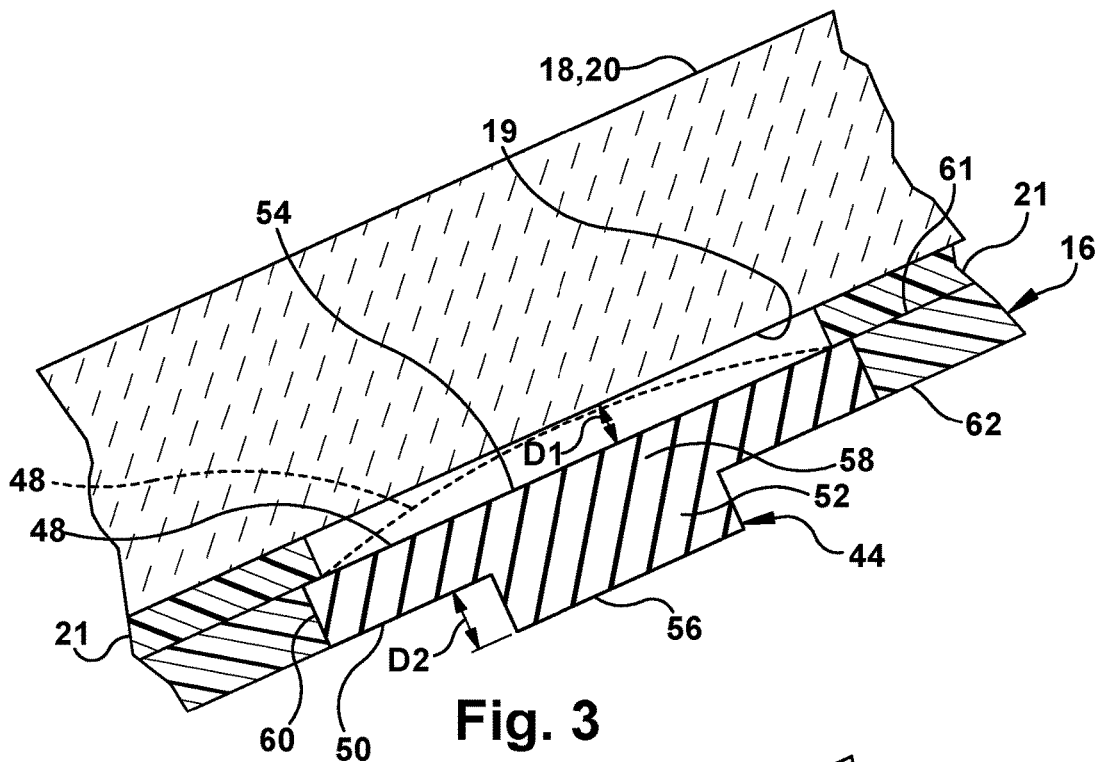
FIG. 3 is an enlarged view of a portion of the apparatus of FIG. 1.

As shown in FIG. 1, the bracket 16 is attached to a window 18 of a vehicle (not shown). More particularly, the bracket 16 is attached to a windscreen or windshield 20 of an automotive vehicle (not shown). The bracket 16 may be attached or secured to the windshield 20 via a layer of adhesive 21 (FIG. 3). The attachment or securement of the bracket 16 may be performed at the premises of the manufacturer of the windshield 20. Thus, when the windshield 20 is shipped or delivered to the manufacturer or assembler of the vehicle (not shown), the bracket 16 may already be attached to the windshield and ready to receive and retain the housing 12 with the vision device 14. The housing 12, which contains or supports the vision device 14, may then be installed or mounted in the bracket 16 after the windshield 20 is installed in the vehicle (not shown) on the assembly line of the vehicle manufacturer or assembler.

Figure 2:
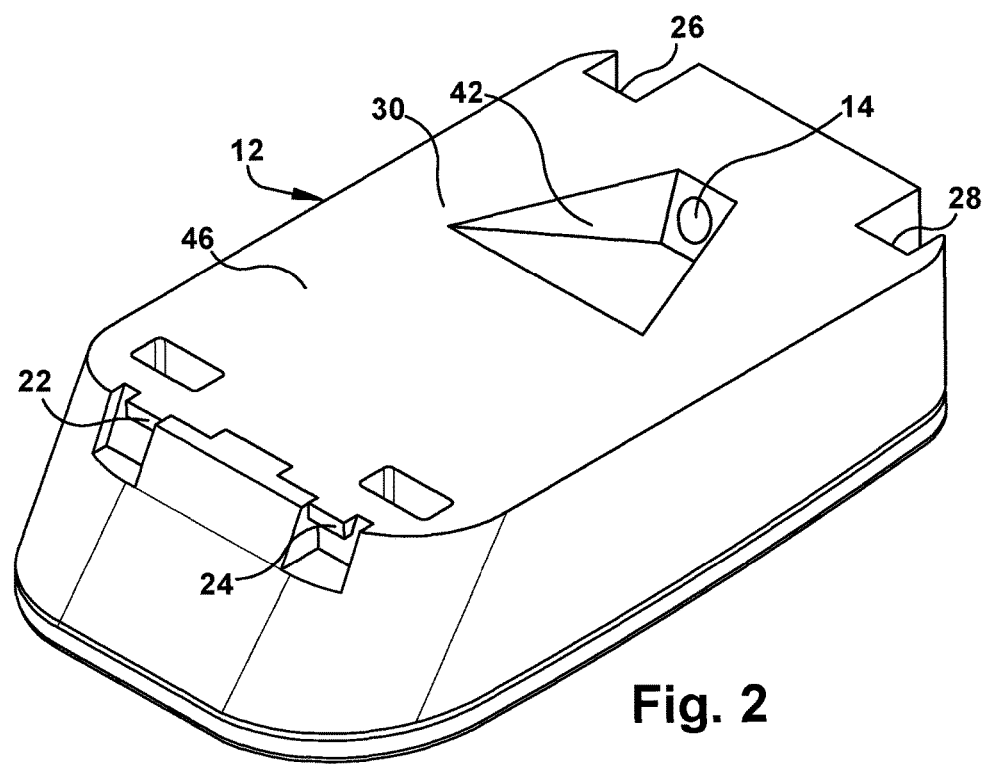
FIG. 2 is a perspective view of a camera housing included in the apparatus of FIG. 1.

The housing 12 may have any construction or configuration suitable to contain or support the vision device 14 and suitable to be received and retained in the bracket 16. As shown in FIGS. 1 and 2, the housing 12 has a generally rectangular configuration. At one end of the housing 12 are two laterally spaced apart tabs 22 and 24 that project away from the remainder of the housing along the length of the housing. At the opposite end of the housing 12 are two laterally spaced apart slots 26 and 28 that extend from an upper surface 30 (as viewed in FIG. 1) of the housing to a lower surface 32 (as viewed in FIG. 1) of the housing. The tabs 22 and 24 may be engaged by and retained in engagement with two complementarily shaped and laterally spaced apart hooks 34 (only one of which is shown in FIG. 1) formed at one longitudinal end of and in one piece with the bracket 16. The slots 26 and 28 receive two laterally spaced apart arms 36 (only one of which is shown in FIG. 1) formed at the opposite longitudinal end of and in one piece with the bracket 16. Each of the arms 36 includes a projection 38 that engages a corresponding projection 40 on the housing 12. The arms 36 are flexible and resilient so that the projection 38 may snap over the projection 40 and so that the arms may resiliently urge the tabs 22 and 24 into engagement with the hooks 34.

As shown in FIG. 2, a recess 42 is formed in the upper surface 30 of the housing 12 adjacent to the slots 26 and 28. The recess 42 is outwardly and upwardly angled in a direction away from the slots 26 and 28 and toward the tabs 22 and 24. The vision device 14 is contained or mounted in the housing 12 so that the vision device has a view outwardly and upwardly from a position adjacent to the slots 26 and 28. When the housing 12 is mounted in the bracket 16, the vision device 14 will have an unobstructed view through the windshield 20 toward the front of the vehicle (not shown), as indicated by the arrow F in FIG. 1.

Within the housing 12, in the space between the vision device 14 and the tabs 22 and 24 at the front or forward end of the housing, are various electronic components (not shown) for processing the information, in the form of electronic signals, obtained by the vision device. The electronic components (not shown) may be mounted on one or more printed circuit boards (not shown) contained within the housing 12. In operation, the vision device 14 and the electronic components will generate heat, which will need to be dissipated to avoid thermal damage to the electronic components and/or the vision device.

To facilitate dissipation of such heat, the bracket 16 mounts or carries a thermally conductive body 44 that is movable relative to the bracket. When the housing 12 is being pressed or snapped into the bracket 16, the portion 46 of the upper surface 30 of the housing 12 located between the vision device 14 and the tabs 22 and 24 will be pressed against a lower surface of the thermally conductive body 44 and will thereby push or move the conductive body relative to the bracket 16 so that the upper surface of the conductive body engages and presses against the windshield 20 when the housing is fully engaged by and retained in the bracket. Heat will then be conducted from the housing 12 through the thermally conductive body 44 into the windshield 20, where the heat can be more readily dissipated by, for example, air flow over the windshield, which has a much larger surface area and mass for heat dissipation than the thermally conductive body, the housing or the bracket 16. The environment of the vision device 14 may thus be cooled or moderated via the vehicle windshield 20.

In the embodiment of the invention illustrated in FIG. 3, the thermally conductive body 44 is made of a flexible and resilient material, such as an elastomer. The thermally conductive body 44 has a disc-like shape with first and second opposed major side surfaces 48 and 50. The thermally conductive body 44 is mounted in the bracket 16 in an orientation such that when the bracket is attached to the windshield 20, the first major side surface 48 is presented toward the windshield and the opposed second major side surface 50 is presented away from the windshield. The thermally conductive body 44 may, for example, be received in a passage or opening that extends through the bracket 16 from a first surface 61 to an opposed second surface 62 of the bracket. The major side surface 48 is substantially flat or slightly concave. The opposed major side surface 50 is substantially flat or slightly convex. In addition, a projection 52 extends outwardly of and away from the major side surface 50 in a central area or center of the major side surface and the thermally conductive body 44. The projection 52 of the thermally conductive body 44 projects away from the bracket 16 and into a path P in FIG. 1 along which the housing 12 moves when being received in the bracket.

The height of the projection 52 or the extent to which the projection 52 extends away from the major side surface 50 and from the adjacent portion of the second surface 62 of the bracket 16 is established or predetermined so as to ensure that at least a central portion 54 of the major side surface 48 will be in close contact with the windshield 20 when the housing 12 is mounted in the bracket 16 attached to the windshield. More specifically, when the bracket 16 is attached to the windshield 20, the major side surface 48 of the thermally conductive body 44 is spaced apart from the interior side surface 19 of the windshield by a distance D1, as shown in FIG. 3. The height of the projection 52 is a distance D2, as shown in FIG. 3, from an end surface 56 of the projection to the major side surface 50 of the thermally conductive body 44 and to the adjacent portion of the second surface 62 of the bracket 16, which is substantially level with or coplanar with the major side surface 50. The distance D2 is equal to or greater than the distance D1.

As the housing 12 is being mounted in the bracket 16, the portion 46 of the upper surface 30 of the housing 12 located between the vision device 14 and the tabs 22 and 24 will contact the end surface 56 of the projection 52 and will press against the end surface. The pressure applied by the action of mounting the housing 12 in the bracket 16 will push or move the projection 52 and a central portion 58 of the thermally conductive body 44 in an upward direction (as viewed in FIG. 3) relative to the bracket 16 toward the windshield 20. To ensure that the movement of the projection 52 and the central portion 58 of the thermally conductive body 44 is large or great enough to move at least the central portion 54 of the major side surface 48 into close contact with the windshield 20, as shown in dashed lines in FIG. 3, when the housing 12 is mounted in the bracket 16 attached to the windshield, the height of the projection 52 may include (a) the depth of any concavity of the upper major side surface 48, (b) the thickness of the adhesive layer 21, and (c) the height of any space that may exist between the portion 46 of the upper surface 30 of the housing 12 and the major side surface 50 of the thermally conductive body 44 and/or the adjacent surface 62 of the bracket 16.

The thermally conductive body 44 is mounted on or carried by the bracket 16 by being directly attached or connected to the bracket 16. For example, the outer periphery 60 of the thermally conductive body 44 may be attached or connected to the bracket 16 via adhesive. Alternatively, the thermally conductive body 44 and the bracket 16 may be co-molded with each other to provide the direct attachment or connection. Because the thermally conductive body 44 is made of a material that is flexible, the central portion 58 of the thermally conductive body 44 may be moved relative to the bracket 16 even though the outer periphery 60 of the thermally conductive body is bonded to and held against movement relative to the bracket. At the same time, because the thermally conductive body 44 is made of a material that is resilient, the central portion 58 of the thermally conductive body 44 may be compressed as necessary if manufacturing tolerances or other factors cause the height of the projection 52 to exceed the space available for movement of the central portion of the thermally conductive body. As used in this application, the word "flexible" means that a material, such as the material of which the thermally conductive body 44 is made, is capable of being flexed, which is to say capable of being turned, bowed, or twisted without breaking. As used in this application, "resilient" means that a material, such as the material of which the thermally conductive body 44 is formed, is capable of returning freely to a previous position, shape or condition, which is to say capable of recovering its size and shape after deformation.

Figure 4:
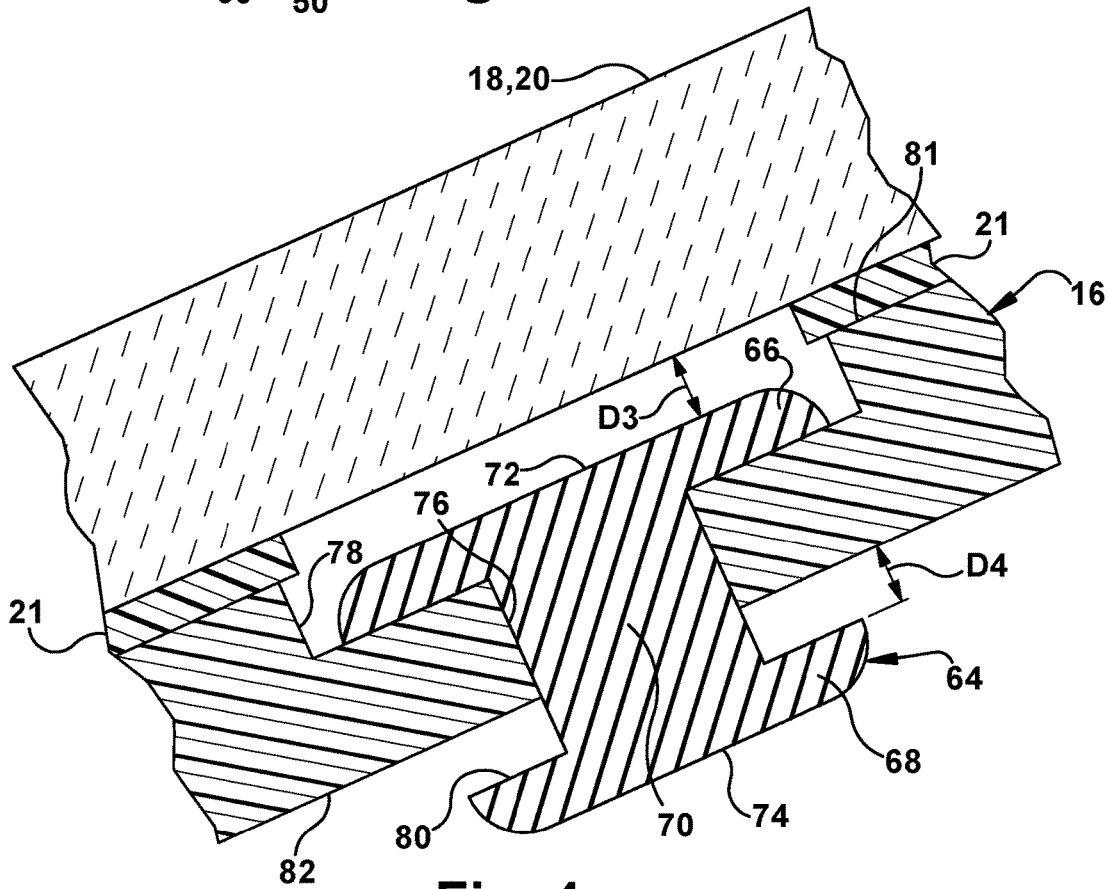
FIG. 4 is an enlarged view corresponding to FIG. 3 of an alternate example embodiment of the present invention.

In the embodiment of the invention illustrated in FIG. 4, the thermally conductive body 64 is made of a flexible and resilient material, such as an elastomer. The thermally conductive body 64 has a shape resembling a dumb-bell with two disc-like portions 66 and 68 separated by and joined to one another by an elongated cylindrical post 70. As can be seen in FIG. 4, the disc-like portions 66 and 68 have larger circumferences and larger diameters than the cylindrical post 70. The thermally conductive body 64 is mounted in the bracket 16 in an orientation such that when the bracket is attached to the windshield 20, a first major side surface 72 of the disc-like portion 66 and of the thermally conductive body is presented toward the windshield and an opposed second major side surface 74 of the disc-like portion 68 and the thermally conductive body is presented away from the windshield. The thermally conductive body 64 may be received in a passage or opening 76 that extends through the bracket 16 from a first surface 81 to an opposed surface second surface 82 of the bracket. The major side surface 72 and the major side surface 74 are both substantially flat.

The thermally conductive body 64 is mounted on or carried by the bracket 16 by having the cylindrical post 70 received in a portion of the passage or opening 76 that has a circumference and a diameter larger than the circumference and diameter of the cylindrical post but less than the circumferences and diameters of the disc-like portions 66 and 68. Thus, the disc-like portions 66 and 68 retain the thermally conductive body 64 in the passage 76 and in the bracket 16. At the same time, the height or length of the cylindrical post 70 is larger than or greater than the length of the portion of the passage 76. As a consequence, the thermally conductive body 64 is free to move axially in the portion of the passage 76 within a range of motion determined by the difference between the length of the cylindrical post 70 and the length of the portion of the passage 76. As can be seen in FIG. 4, the passage 76 may include a recess, depression or countersink 78 formed in the bracket 16 to receive the disc-like portion 66 and thereby to facilitate mounting the bracket on the windshield 20 without interference with the thermally conductive body 64. At the same time, the disc-like portion 68 of the thermally conductive body 64 projects away from the bracket 16 and into the path P along which the housing 12 moves when being received in the bracket.

The length of the thermally conductive body 64, which is the distance from the major side surface 72 to the major side surface 74, is established or predetermined so as to ensure that at least a portion of the major side surface 72 will be in close contact with the windshield 20 when the housing 12 is mounted in the bracket 16 attached to the windshield. More specifically, when the bracket 16 is attached to the windshield 20, the major side surface 72 of the thermally conductive body 64 is spaced apart from the interior side surface 19 of the windshield by a distance D3, as shown in FIG. 4. Because the height or length of the cylindrical post 70 of the thermally conductive body 64 is larger than or greater than the length of the passage 76 in the bracket 16, the disc-like portion 68 of the thermally conductive body 64 is spaced apart from the bracket by a distance D4, as shown in FIG. 4. In other words, the surface 80 of the disc-like portion 68 opposite the major side surface 74 is spaced apart from an adjacent portion of the second surface 82 of the bracket 16 by the distance D4. The distance D4 is equal to or greater than the distance D3.

As the housing 12 is being mounted in the bracket 16, the portion 46 of the upper surface 30 of the housing 12 located between the vision device 14 and the tabs 22 and 24 will contact the major side surface 74 of the disc-like portion 68 of the thermally conductive body 64 and will press against the major side surface 74. The pressure applied by the action of mounting the housing 12 in the bracket 16 will push or move all of the thermally conductive body 64 in an upward direction (as viewed in FIG. 4) relative to the bracket 16 toward the windshield 20. To ensure that the movement of the thermally conductive body 64 is large or great enough to move at least a portion of the major side surface 72 into close contact with the windshield 20 when the housing 12 is mounted in the bracket 16 attached to the windshield, the height of the thermally conductive body 64 may include (a) the thickness of the portion of the bracket 16 in which the thermally conductive body is mounted or carried, (b) the thickness of the adhesive layer 21, and (c) the height of any space that may exist between the portion 46 of the upper surface 30 of the housing 12 and the adjacent surface 82 of the bracket 16. Because the thermally conductive body 64 is made of a material that is resilient, the thermally conductive body 64 may be compressed as necessary if manufacturing tolerances or other factors cause the height of the thermally conductive body to exceed the space available for movement.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for moderating an environment of a driver assist camera of a vehicle comprising:
    a housing in which the driver assist camera is mountable;
    a bracket configured and dimensioned to receive and retain the housing, the bracket when installed in a vehicle being attached to a window of the vehicle; and
    a thermally conductive body movably mounted on the bracket;
    the housing, when being received in the bracket, engaging the thermally conductive body to move the thermally conductive body relative to the bracket, movement of the thermally conductive body relative to the bracket causing the thermally conductive body to be pressed against the window such that heat generated by the driver assist camera is conducted from the housing through the thermally conductive body and into the window to dissipate the heat generated by the driver assist camera.

2. The apparatus of claim 1 wherein a portion of the thermally conductive body projects away from the bracket and into a path along which the housing moves when being received in the bracket.

3. The apparatus of claim 1 wherein a portion of the thermally conductive body moves relative to the bracket when the thermally conductive body is being contacted and moved by the housing.

4. The apparatus of claim 1 wherein all of the thermally conductive body moves relative to the bracket when the thermally conductive body is being contacted and moved by the housing.

5. The apparatus of claim 1 wherein a first surface of the thermally conductive body is presented toward the window when the bracket is installed in a vehicle, the first surface being spaced apart from the window, an opposite second surface of the thermally conductive body being presented toward the housing and being contacted by the housing when the housing is received in the bracket.

6. The apparatus of claim 1 wherein the thermally conductive body is received in an opening extending through the bracket from a first surface of the bracket to an opposed second surface of the bracket.

* * * * *